US012606434B2

(12) United States Patent
Davenne et al.

(10) Patent No.: US 12,606,434 B2
(45) Date of Patent: Apr. 21, 2026

(54) METHOD AND SYSTEM FOR PRODUCING HYDROGEN

(71) Applicant: UNITED KINGDOM RESEARCH AND INNOVATION, Swindon (GB)

(72) Inventors: Tristan Davenne, Oxfordshire (GB); Simeon Greenwood, Oxfordshire (GB); Adam Huddart, Oxfordshire (GB)

(73) Assignee: UNITED KINGDOM RESEARCH AND INNOVATION, Swindon (GB)

( * ) Notice: Subject to any disclaimer, the term of this patent is extended or adjusted under 35 U.S.C. 154(b) by 990 days.

(21) Appl. No.: 17/756,847

(22) PCT Filed: Dec. 4, 2020

(86) PCT No.: PCT/GB2020/053109
§ 371 (c)(1),
(2) Date: Jun. 3, 2022

(87) PCT Pub. No.: WO2021/111144
PCT Pub. Date: Jun. 10, 2021

(65) Prior Publication Data
US 2023/0026733 A1 Jan. 26, 2023

(30) Foreign Application Priority Data
Dec. 5, 2019 (GB) ..................................... 1917810

(51) Int. Cl.
*C01B 3/04* (2006.01)
*C01B 3/047* (2026.01)

(52) U.S. Cl.
CPC .................................... *C01B 3/047* (2013.01)

(58) Field of Classification Search
CPC ......... C01B 3/047; Y02E 60/36; Y02P 20/133
See application file for complete search history.

(56) References Cited

U.S. PATENT DOCUMENTS

| | | | | |
|---|---|---|---|---|
| 3,451,783 A | * | 6/1969 | Collins | .................... C01B 3/047 422/111 |
| 2007/0261756 A1 | | 11/2007 | Handa | |
| 2014/0311135 A1 | * | 10/2014 | Miyagawa | .......... F02D 41/0025 60/287 |
| 2016/0289068 A1 | * | 10/2016 | Jones | ...................... C01B 3/047 |

FOREIGN PATENT DOCUMENTS

| | | |
|---|---|---|
| WO | WO 2015044691 A1 | 4/2015 |
| WO | WO 2018235059 A1 | 12/2018 |

OTHER PUBLICATIONS

International Search Report for International Application No. PCT/GB2020/053109, mailed May 3, 2021, 4 pages.

* cited by examiner

*Primary Examiner* — Anthony J Zimmer
*Assistant Examiner* — Syed T Iqbal
(74) *Attorney, Agent, or Firm* — Lathrop GPM LLP; Brian C. Trinque; Christine Greene

(57) ABSTRACT

The present invention relates to a method of producing hydrogen from ammonia and to a system for producing hydrogen from ammonia.

12 Claims, 1 Drawing Sheet

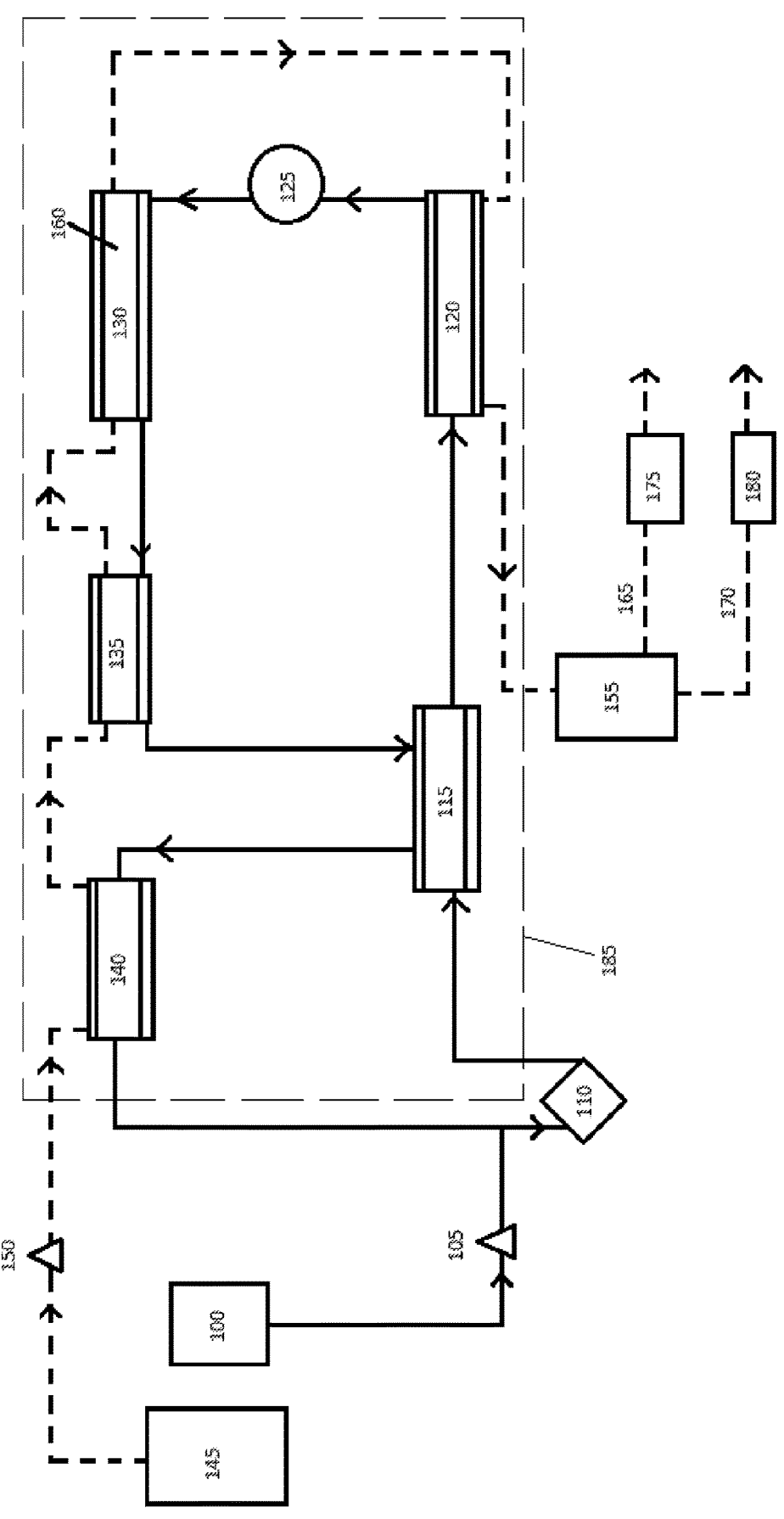

METHOD AND SYSTEM FOR PRODUCING HYDROGEN

CROSS-REFERENCE TO RELATED APPLICATIONS

This application is a 35 U.S.C. § 371 filing of International Patent Application No. PCT/GB2020/053109, filed Dec. 4, 2020, which application claims priority to Great Britain Provisional Patent Application No. 1917810.2, filed Dec. 5, 2019, the contents of which is incorporated by reference in its entirety.

TECHNICAL FIELD

The present invention relates to a method of producing hydrogen from ammonia. The invention also relates to a system for producing hydrogen from ammonia.

BACKGROUND TO THE INVENTION

In a new energy paradigm where distributed renewable generation systems cohabit with increasingly larger wind or photovoltaic (PV) power plants located further away from end users, the ability to effectively store large quantities of energy in a despatchable form is a key element to ensure security and flexibility for the energy system. Energy storage provides a wide portfolio of services from grid services to the decarbonisation of energy intensive sectors including transport, industry, heating and cooling services. In this context, green hydrogen produced by electrolysis and blue hydrogen produced from natural gas with carbon capture and storage could be key to unlocking the full potential of renewables to decarbonise energy systems and meet the net zero emission targets. Despite this potential, the low volumetric energy density of hydrogen inhibits its use as an economically viable energy vector, even when compressed to high pressures or liquefied.

To overcome this disadvantage, a number of hydrogen 'carriers' have been considered. Amongst the available options, ammonia, in liquid form, is a carbon-free and readily despatchable hydrogen carrier allowing the cost-effective storage and distribution of large quantities of renewable energy. Ammonia has been produced in very large quantities for use as a fertiliser for over 75 years. It is a primary candidate to enable a secure supply of renewable hydrogen to a full range of stationary and mobile applications thanks to its existing infrastructures, ease of storage, well-defined regulation and very good safety history. Although ammonia production, handling practices and supply chains are mature and well established, efficient processes for the recovery of hydrogen from ammonia must be developed as efficient technologies which can generate pure hydrogen remain in their infancy.

Methods of producing hydrogen from ammonia are described in WO 2013/057473 and WO 2015/044691.

It is one object of the present invention to provide a more efficient method of producing hydrogen from ammonia.

It is a further object of the invention to provide a commercially viable method of producing hydrogen from ammonia.

It is a further object of the present invention to provide a safe method of producing hydrogen from ammonia.

It is a further object of the present invention to provide a method of producing a higher amount of hydrogen from ammonia per day, compared to prior art methods. For instance, the inventive method and system aim to provide about 5 kg of hydrogen per day, or about 50 kg of hydrogen per day, or about 100 kg of hydrogen per day, or about 200 kg of hydrogen per day.

It is a further object of the present invention to overcome at least some of the disadvantages of the prior art or to provide a commercially useful alternative thereto.

SUMMARY OF THE INVENTION

In a first aspect the invention provides a method of producing hydrogen from ammonia, the method comprising:
- (a) providing liquid ammonia;
- (b) heating the liquid ammonia in an evaporator to provide gaseous ammonia, wherein the evaporator is in thermal contact with an inert gas loop which heats and evaporates at least a portion of the liquid ammonia in the reactor;
- (c) contacting in a reactor at least a portion of the gaseous ammonia with a metal amide and/or a metal imide to produce hydrogen and nitrogen, wherein the reactor is in thermal contact with the inert gas loop which thereby heats at least a portion of the reactor;
- (d) cooling at least a portion of the hydrogen and nitrogen produced in the reactor in a first heat exchanger, wherein the first heat exchanger is in thermal contact with the inert gas loop and heat is transferred from at least a portion of the hydrogen and nitrogen produced in the reactor to the inert gas loop;

wherein the inert gas loop is a loop containing at least one inert gas being pumped such that the at least one inert gas is brought into thermal contact with the first heat exchanger before being brought into thermal contact with the reactor and subsequently being brought into thermal contact with the evaporator;

wherein the at least one inert gas is heated by a heater after being brought into thermal contact with the first heat exchanger and before being brought into thermal contact with the reactor.

Without wishing to be bound by theory, it is thought that the use of the inert gas loop in such a configuration safely improves the efficiency and commercial viability of the production of hydrogen from ammonia. For example, using a first heat exchanger to transfer heat from the hydrogen and nitrogen produced in the reactor to the at least one inert gas in the inert gas loop allows this heat to be advantageously recycled, thereby increasing thermal efficiency. The inert gas loop also facilitates an inherently safe method, where hydrogen produced at high temperatures is separate from the heater.

In a further aspect of the invention there is provided a system for producing hydrogen from ammonia, the system comprising:

an evaporator for receiving and evaporating liquid ammonia to produce gaseous ammonia, wherein the evaporator is in thermal contact with an inert gas loop for heating and evaporating at least a portion of the liquid ammonia in the evaporator; a reactor for reacting gaseous ammonia to produce hydrogen and nitrogen, the reactor being in fluid communication with the evaporator, wherein the reactor is in thermal contact with the inert gas loop for heating at least a portion of the reactor; a first heat exchanger for cooling at least a portion of the hydrogen and nitrogen produced in the reactor, the first heat exchanger being in fluid communication with the reactor, wherein the first heat exchanger is in thermal contact with the inert gas loop for transferring heat from at least a portion of the hydrogen and nitrogen produced in the reactor to the inert gas loop;

wherein the inert gas loop is a loop containing at least one inert gas, a pump and a heater, wherein the loop is configured such that the at least one inert gas can be pumped by the pump to be brought into thermal contact with the first heat exchanger before being brought into thermal contact with the reactor and subsequently being brought into thermal contact with the evaporator;

wherein the loop is further configured such that the heater heats the at least one inert gas after being brought into thermal contact with the first heat exchanger and before being brought into thermal contact with the reactor.

DETAILED DESCRIPTION OF THE INVENTION

Unless otherwise defined herein, scientific and technical terms used in connection with the present invention shall have the meanings that are commonly understood by those of ordinary skill in the art. The meaning and scope of the terms should be clear, however, in the event of any latent ambiguity, definitions provided herein take precedent over any dictionary or extrinsic definition.

As used in the specification and the appended claims, unless specified to the contrary, the following terms have the meaning indicated:

As used herein, the term "inert gas loop" refers to a closed loop containing only one or more inert gases, i.e. the loop does not contain any other (non-inert) gas or chemical entity, wherein the at least one inert gas can be pumped around the loop more than once. For instance, the inert gas loop can be a closed looped pipe containing one or two inert gases only, with a sealable entrance (e.g. a valve) for initially inserting the inert gas(es). The terms "inert gas loop" and "loop" are used interchangeably herein.

The invention provides a method of producing hydrogen from ammonia, the method comprising:

(a) providing liquid ammonia;

(b) heating the liquid ammonia in an evaporator to provide gaseous ammonia, wherein the evaporator is in thermal contact with an inert gas loop which heats and evaporates at least a portion of the liquid ammonia in the reactor;

(c) contacting in a reactor at least a portion of the gaseous ammonia with a metal amide and/or a metal imide to produce hydrogen and nitrogen, wherein the reactor is in thermal contact with the inert gas loop which thereby heats at least a portion of the reactor;

(d) cooling at least a portion of the hydrogen and nitrogen produced in the reactor in a first heat exchanger, wherein the first heat exchanger is in thermal contact with the inert gas loop and heat is transferred from at least a portion of the hydrogen and nitrogen produced in the reactor to the inert gas loop;

wherein the inert gas loop is a loop containing at least one inert gas being pumped such that the at least one inert gas is brought into thermal contact with the first heat exchanger before being brought into thermal contact with the reactor and subsequently being brought into thermal contact with the evaporator;

wherein the at least one inert gas is heated by a heater after being brought into thermal contact with the first heat exchanger and before being brought into thermal contact with the reactor.

Suitable metal amides and metal imides are known in the art, as described in WO 2013/057473 and WO 2015/044691. Preferably, the metal amide and/or metal imide is lithium amide and/or lithium imide, sodium amide and/or imide, lithium-calcium imide ($Li_2Ca(NH)_2$), calcium imide, lithium magnesium imide ($Li_2Mg(NH)_2$) or combinations of two or more thereof. More preferably, the metal amide and/or metal imide is lithium amide and/or lithium imide, sodium amide and/or sodium imide. More preferably still, the metal amide and/or a metal imide is lithium amide and/or lithium imide. More preferably still, the metal amide and/or a metal imide is a mixture of lithium amide and lithium imide. Most preferably, the metal amide and/or a metal imide comprises lithium imide.

Preferably, the metal amide and/or a metal imide is present in an amount of about 50 g to about 150 g, more preferably about 75 g to about 125 g, most preferably about 85 g to about 115 g.

Alternatively, preferably, the metal amide and/or a metal imide is present in an amount of about 3 kg to about 4 kg, more preferably about 3.5 kg to about 4.5 kg, most preferably about 3.8 kg to about 4.2 kg.

Suitable inert gases for use herein are known in the art. The at least one inert gas used in the method described herein may, for example, be nitrogen, argon, helium, neon, krypton, xenon or radon. Preferably, the at least one inert gas is nitrogen and/or argon. Most preferably, the at least one inert gas is nitrogen.

As mentioned above, the inert gas loop is a loop containing one or more inert gases only (i.e. the inert gas loop does not contain any other gas or chemical entity). More preferably, the inert gas loop is a loop containing only an inert gas, wherein the inert gas is argon, nitrogen or a mixture thereof. Most preferably, the inert gas loop is a loop containing only an inert gas, wherein the inert gas comprises or consists of nitrogen.

Preferably, the gaseous ammonia is at a temperature of at least 350° C. before entering the reactor, more preferably at least 375° C.

Preferably, the heater heats the at least one inert gas to at least 600° C., such that the at least one inert gas is brought into thermal contact with the reactor at a temperature of at least 600° C., thereby heating the reactor to a temperature of at least 600° C. Preferably, the heater heats the at least one inert gas to at least 700° C., such that the at least one inert gas is brought into thermal contact with the reactor at a temperature of at least 700° C., thereby heating the reactor to a temperature of at least 700° C. Alternatively, preferably, the heater heats the at least one inert gas to about 600° C. to about 800° C., such that the at least one inert gas is brought into thermal contact with the reactor at a temperature of about 600° C. to about 800° C., thereby heating the reactor to a temperature of about 600° C. to about 800° C. More preferably, the heater heats the at least one inert gas to about 700° C. to about 800° C., such that the at least one inert gas is brought into thermal contact with the reactor at a temperature of about 700° C. to about 800° C., thereby heating the reactor to a temperature of about 700° C. to about 800° C.

Preferably, the liquid ammonia is at a temperature of at least 10° C. before entering the evaporator, more preferably at least 15° C.

Preferably, the at least one inert gas is at a temperature of about 200° C. to about 450° C. when it is brought into thermal contact with the evaporator, thereby heating the evaporator to a temperature of about 200° C. to about 450° C. More preferably, the at least one inert gas is at a temperature of about 200° C. to about 300° C. when it is brought into thermal contact with the evaporator, thereby heating the evaporator to a temperature of about 200° C. to about 300° C. Most preferably, the at least one inert gas is at a temperature of about 225° C. to about 275° C. when it is brought into thermal contact with the evaporator, thereby heating the evaporator to a temperature of about 225° C. to about 275° C.

Preferably, the method further comprises heating at least a portion of the gaseous ammonia provided in step (b) in a pre-heating zone before passing the gaseous ammonia to the reactor in step (c); wherein the pre-heating zone is in thermal contact with the inert gas loop which heats at least a portion of the gaseous ammonia in the pre-heating zone;

wherein the at least one inert gas in the inert gas loop is pumped such that the at least one inert gas is brought into thermal contact with the pre-heating zone after being brought into thermal contact with the reactor and before being brought into thermal contact with the evaporator.

Preferably, the gaseous ammonia is at a temperature of at least 40° C. before entering the pre-heating zone, more preferably at least 45° C.

Preferably, the at least one inert gas is at a temperature of about 400° C. to about 500° C. when it is brought into thermal contact with the pre-heating zone, thereby heating the pre-heating zone to a temperature of about 400° C. to about 500° C.

Preferably, the inert gas loop is further configured such that the at least one inert gas is pumped by a pump after being brought into thermal contact with the evaporator and before being brought into thermal contact with the first heat exchanger. The use of the inert gas loop with the pump in such a configuration advantageously allows the pump to operate at the lowest temperature possible, obviating the need to use a pump that is operable at higher temperatures. Preferably, in such a configuration, the at least one inert gas is at a temperature of less than 150° C. when being pumped by the pump, more preferably less than 140° C.

Preferably, heat is transferred in a second heat exchanger from the at least one inert gas after it has been brought into thermal contact with the reactor and/or the pre-heating zone but before it has been brought into thermal contact with the evaporator to a further portion of the at least one inert gas after it has been brought into thermal contact with the evaporator but before it has been brought into thermal contact with the first heat exchanger. More preferably, in such a configuration, the inert gas loop is further configured such that the at least one inert gas is pumped by a pump after being brought into thermal contact with the evaporator and before being heated in the second heat exchanger and subsequently being brought into thermal contact with the first heat exchanger. The use of the inert gas loop with the pump in such a configuration advantageously allows the pump to operate at the lowest temperature possible, obviating the need to use a pump that is operable at higher temperatures.

Preferably, the at least one inert gas is at a temperature of about 300° C. to about 500° C. after leaving the reactor and/or the pre-heating zone when transferring heat in the second heat exchanger before being brought into thermal contact with the evaporator. More preferably, the at least one inert gas is at a temperature of about 300° C. to about 400° C. after leaving the reactor and/or the pre-heating zone when transferring heat in the second heat exchanger before being brought into thermal contact with the evaporator.

Preferably, the at least one inert gas is at a temperature of about 200° C. to 300° C. after receiving heat in the second heat exchanger after leaving the evaporator and before being brought into thermal contact with the first heat exchanger.

Preferably, the evaporator, the reactor, the first heat exchanger and optionally the pre-heating zone (when present) and optionally the second heat exchanger (when present) are contained in a vacuum chamber. Containing the evaporator, the reactor, the first heat exchanger and optionally the pre-heating zone (when present) and the second heat exchanger (when present) is advantageous because it (a) reduces heat loss and (b) contains any leak of reactants that may occur, thus improving the safety of the method (for example, by preventing their mixing with oxygen).

Preferably, the heater is an electric heater or a third heat exchanger connected to an ammonia burner. Preferably, the heater is an electric heater. More preferably, the heater is a third heat exchanger connected to an ammonia burner.

Preferably, the reactor is at least partially surrounded with at least one concentric radiation shield. Suitable concentric radiation shields are known in the art. At least partially surrounding the reactor with at least one concentric radiation shield is advantageous because it reduces heat loss.

Preferably, the method further comprises passing at least a portion of the cooled hydrogen and nitrogen obtained in step (d) to a separator to produce a stream of hydrogen. Separators suitable for separating hydrogen and nitrogen are known in the art. Preferably, the separator is a palladium membrane separator, a polymeric membrane separator, a cryogenic separator, temperature swing adsorption separator or a pressure swing adsorption separator. More preferably, the separator is a palladium membrane separator or a polymeric membrane separator. Most preferably, the separator is a palladium membrane separator.

Preferably the hydrogen produced by the method described herein is high purity hydrogen, suitable, for example, for use in fuel cells, preferably for use in proton-exchange membrane (PEM) fuel cells.

Preferably, the mass flow of the at least one inert gas through the inert gas loop is higher than the mass flow of ammonia through the evaporator, the reactor and/or the pre-heating zone, if present. More preferably, the mass flow of the at least one inert gas through the inert gas loop is about 5 to about 15 times higher than the mass flow of ammonia through the evaporator, the reactor and/or the pre-heating zone, if present. More preferably still, the mass flow of the at least one inert gas through the inert gas loop is about 8 to about 12 times higher than the mass flow of ammonia through the evaporator, the reactor and/or the pre-heating zone, if present. Without wishing to be bound by theory, it is thought that the mass flow of the at least one inert gas being higher than the mass flow of ammonia is advantageous because it facilitates a high heat flux which feeds the endothermic reaction between the gaseous ammonia and the metal amide and/or a metal imide to produce hydrogen and nitrogen without a large variation in temperature across the reactor. Furthermore, it is thought that the mass flow of the at least one inert gas being higher than the mass flow of ammonia facilitates maintaining the metal amide and/or a metal imide at a near constant ideal operating temperature despite the strong endothermic reaction to produce hydrogen and nitrogen from ammonia.

Preferably, the at least one inert gas in the inert gas loop is at a pressure of about 0.5 MPa to about 1.5 MPa, more preferably about 0.75 MPa to about 1.25 MPa, most preferably about 0.9 MPa to about 1.1 MPa. Operating the inert gas loop at such an elevated pressure is thought to significantly reduce the pressure difference required to pump the at least one inert gas and also reduces the duty on the pump and its power requirements, compared to operation at nominal atmospheric pressure.

Preferably, the liquid and/or gaseous ammonia is at a pressure of about 0.5 MPa to about 1.5 MPa, more preferably about 0.75 MPa to about 1.25 MPa, most preferably about 0.9 MPa to about 1.1 MPa.

Optionally, the method further comprises heating at least a portion of the liquid ammonia in the evaporator to provide gaseous ammonia, wherein the evaporator is in thermal contact with a second evaporator heat source, which heats at least a portion of the liquid ammonia in the reactor. Preferably, the second evaporator heat source comprises one or more of solar energy, geothermal heat or exhaust gas heat.

Optionally, when a pre-heating zone is present, the method further comprises heating at least a portion of the gaseous ammonia provided in step (b) in the pre-heating zone, wherein the pre-heating zone is in thermal contact with a second pre-heating zone heat source, which heats at least a portion of the gaseous ammonia provided in step (b). Preferably, the second pre-heating zone heat source comprises one or more of solar energy, geothermal heat or exhaust gas heat.

The invention also provides a system for producing hydrogen from ammonia, the system comprising:

an evaporator for receiving and evaporating liquid ammonia to produce gaseous ammonia, wherein the evaporator is in thermal contact with an inert gas loop for heating and evaporating at least a portion of the liquid ammonia in the evaporator; a reactor for reacting gaseous ammonia to produce hydrogen and nitrogen, the reactor being in fluid communication with the evaporator, wherein the reactor is in thermal contact with the inert gas loop for heating at least a portion of the reactor; a first heat exchanger for cooling at least a portion of the hydrogen and nitrogen produced in the reactor, the first heat exchanger being in fluid communication with the reactor, wherein the first heat exchanger is in thermal contact with the inert gas loop for transferring heat from at least a portion of the hydrogen and nitrogen produced in the reactor to the inert gas loop;

wherein the inert gas loop is a loop containing at least one inert gas, a pump and a heater, wherein the loop is configured such that the at least one inert gas can be pumped by the pump to be brought into thermal contact with the first heat exchanger before being brought into thermal contact with the reactor and subsequently being brought into thermal contact with the evaporator;

wherein the loop is further configured such that the heater heats the at least one inert gas after being brought into thermal contact with the first heat exchanger and before being brought into thermal contact with the reactor.

Suitable metal amides and metal imides are known in the art, as described in WO 2013/057473 and WO 2015/044691. Preferably, the metal amide and/or metal imide is lithium amide and/or lithium imide, sodium amide and/or imide, lithium-calcium imide ($Li_2Ca(NH)_2$), calcium imide, lithium magnesium imide ($Li_2Mg(NH)_2$) or combinations of two or more thereof. More preferably, the metal amide and/or metal imide is lithium amide and/or lithium imide, sodium amide and/or sodium imide. More preferably still, the metal amide and/or a metal imide is lithium amide and/or lithium imide. More preferably still, the metal amide and/or a metal imide is mixture of lithium amide and lithium imide. Most preferably, the metal amide and/or a metal imide comprises lithium imide.

Preferably, the metal amide and/or a metal imide is present in an amount of about 50 g to about 150 g, more preferably about 75 g to about 125 g, most preferably about 85 g to about 115 g.

Alternatively, preferably, the metal amide and/or a metal imide is present in an amount of about 3 kg to about 4 kg, more preferably about 3.5 kg to about 4.5 kg, most preferably about 3.8 kg to about 4.2 kg.

Suitable inert gases for use herein are known in the art. The at least one inert gas used in the method described herein may, for example, be nitrogen, argon, helium, neon, krypton, xenon or radon. Preferably, the at least one inert gas is nitrogen and/or argon. Most preferably, the at least one inert gas is nitrogen.

As mentioned above, the inert gas loop is a loop containing one or more inert gases only (i.e. the inert gas loop does not contain any other gas or chemical entity). More preferably, the inert gas loop is a loop containing only an inert gas, wherein the inert gas is argon, nitrogen or a mixture thereof. Most preferably, the inert gas loop is a loop containing only an inert gas, wherein the inert gas comprises or consists of nitrogen.

Preferably, the system further comprises a pre-heating zone for heating gaseous ammonia received from the evaporator, the pre-heating zone being in fluid communication with the evaporator and the reactor, wherein the pre-heating zone is in thermal contact with the inert gas loop for heating at least a portion of the gaseous ammonia in the pre-heating zone;

wherein the loop is configured such that the at least one inert gas can be pumped by the pump to be brought into thermal contact with the pre-heating zone after being brought into thermal contact with the reactor and before being brought into thermal contact with the evaporator.

Preferably the pump is situated in the loop between the evaporator and the first heat exchanger, wherein the inert gas loop is configured such that the at least one inert gas can be pumped by the pump after being brought into thermal contact with the evaporator and before being brought into thermal contact with the first heat exchanger. The use of the inert gas loop with the pump in such a configuration advantageously allows the pump to operate at the lowest temperature possible, obviating the need to use a pump that is operable at higher temperatures.

Preferably, the loop further comprises a second heat exchanger, wherein the second heat exchanger is configured such that heat can be transferred from the at least one inert gas after it has been brought into thermal contact with the reactor and/or the pre-heating zone but before it has been brought into thermal contact with the evaporator to a further portion of the at least one inert gas after it has been brought into thermal contact with the evaporator but before it has been brought into thermal contact with the first heat exchanger. More preferably, in such a configuration, the pump is situated in the loop between the evaporator and the second heat exchanger, wherein the inert gas loop is configured such that the at least one inert gas can be pumped by the pump after being brought into thermal contact with the evaporator and before being heated in the second heat exchanger and subsequently being brought into thermal contact with the first heat exchanger. The use of the inert gas loop with the pump in such a configuration advantageously allows the pump to operate at the lowest temperature possible, obviating the need to use a pump that is operable at high temperatures.

Preferably, the evaporator, the reactor, the first heat exchanger and optionally the pre-heating zone (when present) and optionally the second heat exchanger (when present) are contained in a vacuum chamber. Containing the evaporator, the reactor, the first heat exchanger and optionally the pre-heating zone (when present) and the second heat exchanger (when present) is advantageous because it (a) reduces heat loss and (b) contains any leak of reactants that may occur, thus improving the safety of the system (for example, by preventing their mixing with oxygen).

Preferably, the heater is an electric heater or a third heat exchanger connected to an ammonia burner. Preferably, the heater is an electric heater. More preferably, the heater is a third heat exchanger connected to an ammonia burner.

Preferably, the reactor is at least partially surrounded with at least one concentric radiation shield. Suitable concentric radiation shields are known in the art. At least partially surrounding the reactor with at least one concentric radiation shield is advantageous because it reduces heat loss.

Preferably, the system further comprises a separator in fluid communication with the first heat exchanger for separating at least a portion of the cooled hydrogen and nitrogen. Separators suitable for separating hydrogen and nitrogen are known in the art. Preferably, the separator is a palladium membrane separator, a polymeric membrane separator, a cryogenic separator, temperature swing adsorption separator or a pressure swing adsorption separator. More preferably, the separator is a palladium membrane separator or a polymeric membrane separator. Most preferably, the separator is a palladium membrane separator.

Preferably, the at least one inert gas in the inert gas loop is at a pressure of about 0.5 MPa to about 1.5 MPa, more preferably about 0.75 MPa to about 1.25 MPa, most preferably about 0.9 MPa to about 1.1 MPa. Such an elevated pressure is thought to significantly reduce the pressure difference required to pump the at least one inert gas and also reduces the duty on the pump and its power requirements, compared to operation at nominal atmospheric pressure.

Optionally, the system further comprises a second evaporator heat source for heating at least a portion of the liquid ammonia in the evaporator to provide gaseous ammonia, wherein the second evaporator heat source is in thermal contact with the evaporator, wherein the second evaporator heat source comprises means to provide one or more of solar energy, geothermal heat or exhaust gas heat.

Optionally, when a pre-heating zone is present, the system further comprises a second pre-heating zone heat source for heating at least a portion of the gaseous ammonia in the pre-heating zone, wherein the second pre-heating zone heat source is in thermal contact with the pre-heating zone, wherein the second pre-heating zone heat source comprises means to provide one or more of solar energy, geothermal heat or exhaust gas heat, preferably wherein the second pre-heating zone heat source comprises means to provide exhaust gas heat.

These and other aspects of the invention will now be described with reference to the accompanying FIGURES, in which:

FIG. 1: is a diagram showing a preferred system for producing hydrogen according to the method described herein.

Liquid ammonia is provided by a liquid ammonia source (145) at a pressure of 1 MPa and a temperature of around 20°

C. via a valve (150) and enters the evaporator (140) which is in thermal contact with an inert gas loop. The pathway taken by ammonia and products formed therefrom is represented by a bold dashed line in FIG. 1. Heat from the inert gas is transferred to the liquid ammonia which is heated and evaporated. The gaseous ammonia produced is at a temperature of around 48° C. This gaseous ammonia then passes to a pre-heating zone (135) which is in thermal contact with the inert gas loop. Heat from the inert gas is transferred to the gaseous ammonia which is heated to a temperature of around 390° C. This gaseous ammonia is then passed to a reactor (130) containing lithium amide and lithium imide (160), where the ammonia reacts to form hydrogen and nitrogen. The reactor (130) is in thermal contact with the inert gas loop. Heat from the inert gas is transferred to the reactor which is heated to a temperature of around 700° C. The hydrogen and nitrogen gas, as well as any unreacted gaseous ammonia, produced in the reactor (130) is at a temperature of around 592° C. and this is passed to a first heat exchanger (120) where heat is transferred from the hydrogen and nitrogen gas, as well as any unreacted gaseous ammonia, to the inert gas in the inert gas loop, thereby cooling the hydrogen and nitrogen gas, as well as any unreacted gaseous ammonia, that was produced in the reactor, and heating the inert gas. The hydrogen and nitrogen, as well as any unreacted gaseous ammonia, now at a temperature of around 300° C. and at a pressure of around 0.85 MPa, is then passed to a palladium membrane separator (155), which separates the products, resulting in a high purity product hydrogen stream (165) and a waste-gas stream (170) comprising nitrogen, hydrogen and ammonia. Both the high purity product hydrogen stream (165) and the waste-gas stream (170) are passed through respective magnesium chloride ammonia absorbers (175, 180) to remove any residual ammonia.

An inert gas (a mixture of argon and nitrogen) is provided by an inert gas source (100) to the inert gas loop through a sealable entrance (105), e.g. a valve. The inert gas loop is represented by a solid line in FIG. 1. The inert gas passes through a pump/circulator (110), which pumps the inert gas around the inert gas loop. After leaving the pump (110), the inert gas enters the second heat exchanger (115), where it is heated by heat from the inert gas which has just been brought into thermal contact with the reactor (130) and the pre-heating zone (135) but before it has been brought into thermal contact with the evaporator (140). The heated inert gas exits the second heat exchanger (115) at a temperature of around 247° C. and enters the first heat exchanger (120), where it is heated by heat transferred from the hydrogen and nitrogen gas, as well as any unreacted gaseous ammonia, that was produced in the reactor (130). The heated inert gas is then heated further by a heater (125), e.g. an electric heater. The heated inert gas, now at a temperature of around 770° C. is then brought into thermal contact with the reactor (130), where it heats the reactor (130) to cause the reaction to produce hydrogen and nitrogen from ammonia. The inert gas is at a temperature of around 442° C. after being brought into thermal contact with the reactor (130). The inert gas is then brought into thermal contact with the pre-heating zone (135), where it heats the gaseous ammonia therein. The inert gas is at a temperature of around 360° C. after being brought into thermal contact with the pre-heating zone (135). The inert gas then enters the second heat exchanger (115), where it transfers heat to the inert gas which has just left the pump (110) and before it has entered the first heat exchanger (120). The cooled inert gas exits the second heat exchanger (115) at a temperature of around 247° C. and is then brought into thermal contact with the evaporator (140), transferring heat to evaporate the liquid ammonia therein. After being brought into thermal contact with the evaporator (140), the cooled inert gas is at a temperature of around 130° C. This cooled inert gas is then passes through the pump (110) and is pumped around the inert gas loop once more.

In this illustrated embodiment, the evaporator (140), the reactor (130), the first heat exchanger (120), the pre-heating zone (135), the second heat exchanger (115) and the heater (125) are contained in a vacuum chamber (185).

The method and system according to the present invention are suitable for use, for example, in internal combustion engines, stationary gas turbines, jet engines, proton-exchange membrane fuel cells and household heating systems.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A method of producing hydrogen from ammonia, the method comprising:

(a) providing liquid ammonia;

(b) heating the liquid ammonia in an evaporator to provide gaseous ammonia, wherein the evaporator is in thermal contact with an inert gas loop which heats and evaporates at least a portion of the liquid ammonia in the reactor;

(c) contacting in a reactor at least a portion of the gaseous ammonia with a metal amide and/or a metal imide to produce hydrogen and nitrogen, wherein the reactor is in thermal contact with the inert gas loop which thereby heats at least a portion of the reactor;

(d) cooling at least a portion of the hydrogen and nitrogen produced in the reactor in a first heat exchanger, wherein the first heat exchanger is in thermal contact with the inert gas loop and heat is transferred from at least a portion of the hydrogen and nitrogen produced in the reactor to the inert gas loop;

wherein the inert gas loop is a loop containing at least one inert gas being pumped such that the at least one inert gas is brought into thermal contact with the first heat exchanger before being brought into thermal contact with the reactor and subsequently being brought into thermal contact with the evaporator;

wherein the at least one inert gas is heated by a heater after being brought into thermal contact with the first heat exchanger and before being brought into thermal contact with the reactor.

2. The method of claim 1, wherein the metal amide and/or a metal imide is lithium amide and/or lithium imide.

3. The method of claim 1, wherein the at least one inert gas is nitrogen.

4. The method of claim 1, wherein the heater heats the at least one inert gas to at least 600° C.

5. The method of claim 1, wherein the method further comprises heating at least a portion of the gaseous ammonia provided in step (b) in a pre-heating zone before passing the gaseous ammonia to the reactor in step (c); wherein the pre-heating zone is in thermal contact with the inert gas loop which heats at least a portion of the gaseous ammonia in the pre-heating zone;

wherein the at least one inert gas in the inert gas loop is pumped such that the at least one inert gas is brought into thermal contact with the pre-heating zone after being brought into thermal contact with the reactor and before being brought into thermal contact with the evaporator.

6. The method of claim 5, wherein heat is transferred in a second heat exchanger from the at least one inert gas after it has been brought into thermal contact with the reactor and/or the pre-heating zone but before it has been brought into thermal contact with the evaporator to a further portion of the at least one inert gas after it has been brought into thermal contact with the evaporator but before it has been brought into thermal contact with the first heat exchanger.

7. The method of claim 1, wherein the evaporator, the reactor, and the first heat exchanger are contained in a vacuum chamber.

8. The method of claim 1, wherein the heater is an electric heater or a third heat exchanger connected to an ammonia burner.

9. The method of claim 1, wherein the reactor is at least partially surrounded with at least one concentric radiation shield.

10. The method of claim 1, further comprising passing at least a portion of the cooled hydrogen and nitrogen obtained in step (d) to a separator to produce a stream of hydrogen.

11. The method of claim 10, wherein the separator is a palladium membrane separator.

12. The method of claim 6, wherein the evaporator, the reactor, the first heat exchanger, the pre-heating zone, and the second heat exchanger are contained in a vacuum chamber.

* * * * *